US012756076B2

(12) United States Patent
Kim et al.

(10) Patent No.: US 12,756,076 B2
(45) Date of Patent: Oct. 6, 2026

(54) BATTERY CELL AND BATTERY MODULE INCLUDING THE SAME

(71) Applicant: LG ENERGY SOLUTION, LTD., Seoul (KR)

(72) Inventors: Sangdeuk Kim, Daejeon (KR); Jung Shik Oh, Daejeon (KR); Ga Young Baek, Daejeon (KR); Xing Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 777 days.

(21) Appl. No.: 17/925,224

(22) PCT Filed: Oct. 27, 2021

(86) PCT No.: PCT/KR2021/015243

§ 371 (c)(1),
(2) Date: Nov. 14, 2022

(87) PCT Pub. No.: WO2022/108163

PCT Pub. Date: May 27, 2022

(65) Prior Publication Data

US 2023/0352802 A1 Nov. 2, 2023

(30) Foreign Application Priority Data

Nov. 23, 2020 (KR) ........................ 10-2020-0157743
Oct. 26, 2021 (KR) ........................ 10-2021-0143813

(51) Int. Cl.
*H01M 50/54* (2021.01)
*H01M 50/178* (2021.01)
(Continued)

(52) U.S. Cl.
CPC ......... *H01M 50/54* (2021.01); *H01M 50/178* (2021.01); *H01M 50/186* (2021.01);
(Continued)

(58) Field of Classification Search
CPC .. H01M 50/54; H01M 50/176; H01M 50/186; H01M 50/178
See application file for complete search history.

(56) References Cited

U.S. PATENT DOCUMENTS 2,620,425 A * 12/1952 Seiler .................... B23K 1/002 219/676
2006/0008698 A1 1/2006 Kim et al.
(Continued)

FOREIGN PATENT DOCUMENTS

CN 103887516 A 6/2014
CN 211404627 U 9/2020
(Continued)

OTHER PUBLICATIONS

International Search Report for Application No. PCT/KR2021/015243 mailed Feb. 11, 2022, pp. 1-3.
(Continued)

*Primary Examiner* — Kenneth J Douyette
(74) *Attorney, Agent, or Firm* — Lerner David LLP

(57) ABSTRACT

A battery cell includes an electrode assembly containing a plurality of electrode plates stacked with a separator interposed therebetween; and a battery case in which the electrode assembly is mounted onto a receiving part, wherein the electrode assembly includes a plurality of electrode tabs that are respectively formed to extend from the plurality of electrode plates, wherein the plurality of electrode tabs are mutually arranged on the same line with the same polarity to form an electrode tab arrangement body, and wherein one or more protection members are joined to the ends of the plurality of electrode tabs.

13 Claims, 5 Drawing Sheets

(51) Int. Cl.
*H01M 50/186* (2021.01)
*H01M 50/533* (2021.01)
*H01M 50/534* (2021.01)
*H01M 50/536* (2021.01)

(52) U.S. Cl.
CPC ....... *H01M 50/533* (2021.01); *H01M 50/534* (2021.01); *H01M 50/536* (2021.01)

(56) References Cited

U.S. PATENT DOCUMENTS

| | | | | |
|---|---|---|---|---|
| 2011/0012704 | A1* | 1/2011 | Kimura ............. | H01M 10/4235 337/168 |
| 2018/0102521 | A1 | 4/2018 | Cho et al. | |

FOREIGN PATENT DOCUMENTS

| | | | |
|---|---|---|---|
| JP | S63119125 | A | 5/1988 |
| JP | H08050920 | A | 2/1996 |
| JP | H10214614 | A | 8/1998 |
| JP | 2001202946 | A | 7/2001 |
| JP | 2004311073 | A | 11/2004 |
| JP | 2009181899 | A | 8/2009 |
| JP | 2013222594 | A | 10/2013 |
| JP | 2018511155 | A | 4/2018 |
| KR | 20000038817 | A | 7/2000 |
| KR | 200283452 | Y1 | 9/2002 |
| KR | 20030025077 | A | 3/2003 |
| KR | 20030033212 | A | 5/2003 |
| KR | 100722416 | B1 | 5/2007 |
| KR | 100822184 | B1 | 4/2008 |
| KR | 100960619 | B1 | 6/2010 |
| KR | 20160119509 | A | 10/2016 |
| KR | 20170060937 | A | 6/2017 |
| KR | 20170111994 | A | 10/2017 |
| KR | 20180082748 | A | 7/2018 |
| WO | 2013157445 | A1 | 10/2013 |

OTHER PUBLICATIONS

Extended European Search Report including Written Opinion for Application No. 21894934.5 dated May 17, 2024, pp. 1-9.

Search Report dated Oct. 13, 2025 from the Office Action for Chinese Application No. 202180033830.2 issued Oct. 16, 2025, 3 pages.

* cited by examiner

【FIG. 1】
(PRIOR ART)
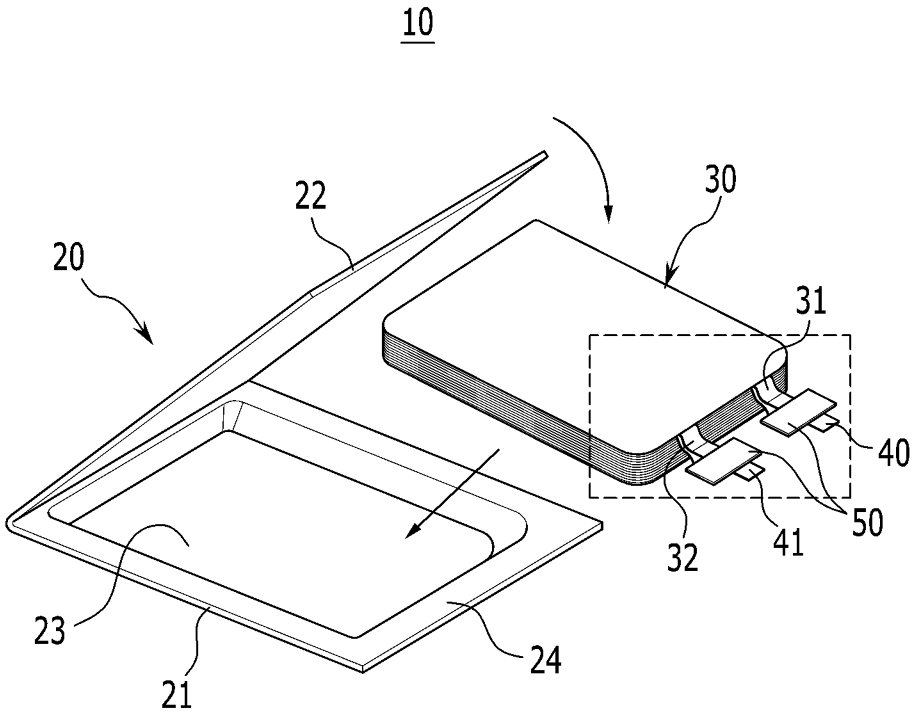

【FIG. 2】
(PRIOR ART)
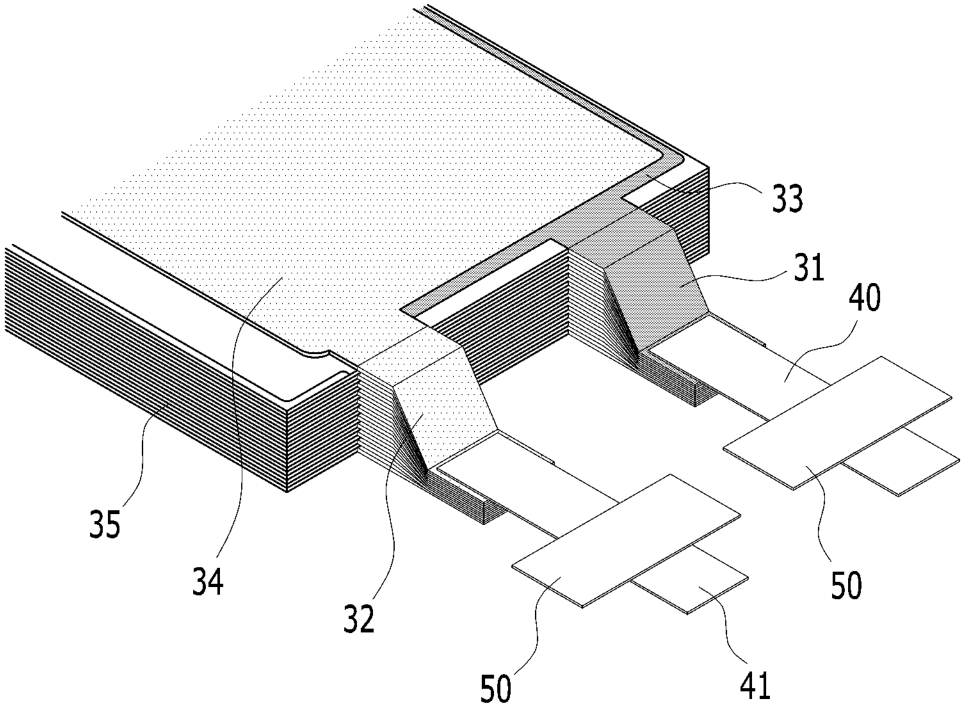
【FIG. 3】
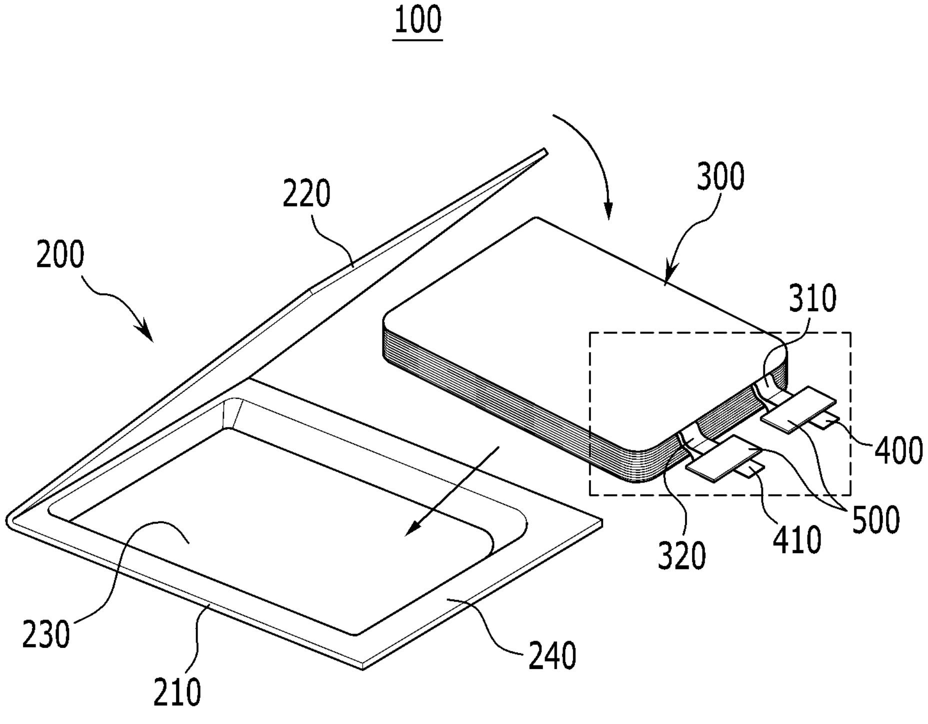

【FIG. 4】
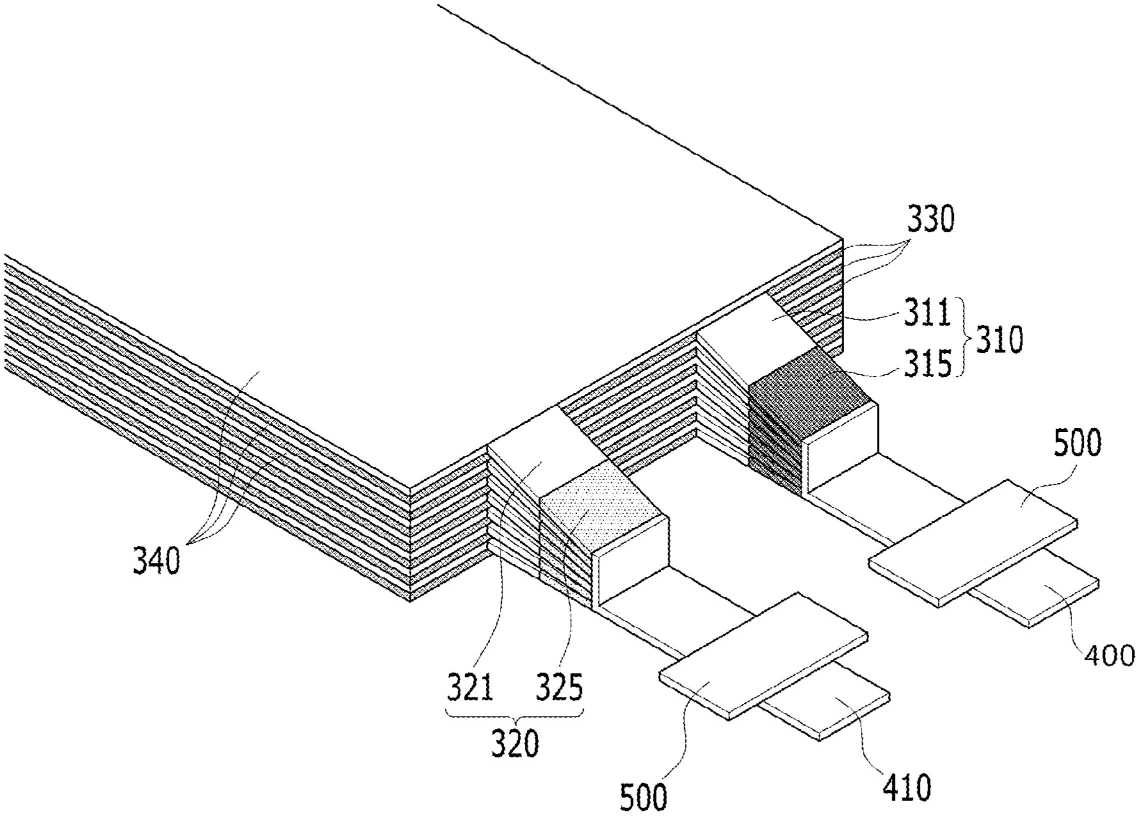

【FIG. 6】
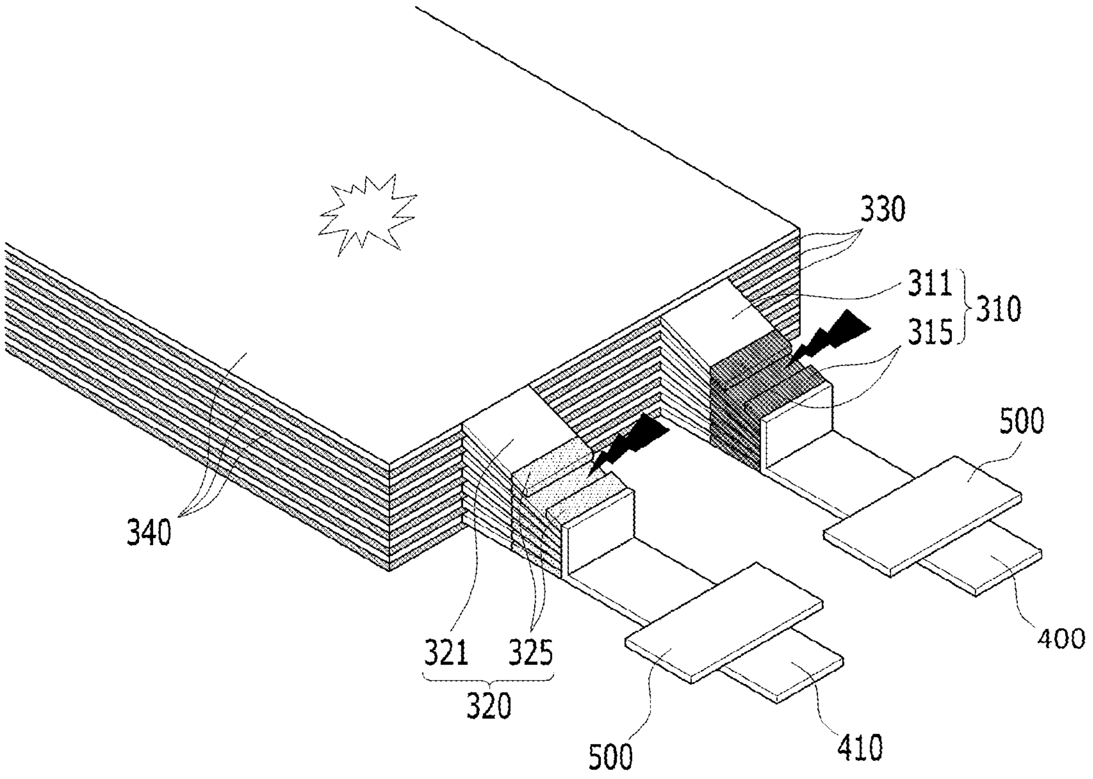
【FIG. 7】
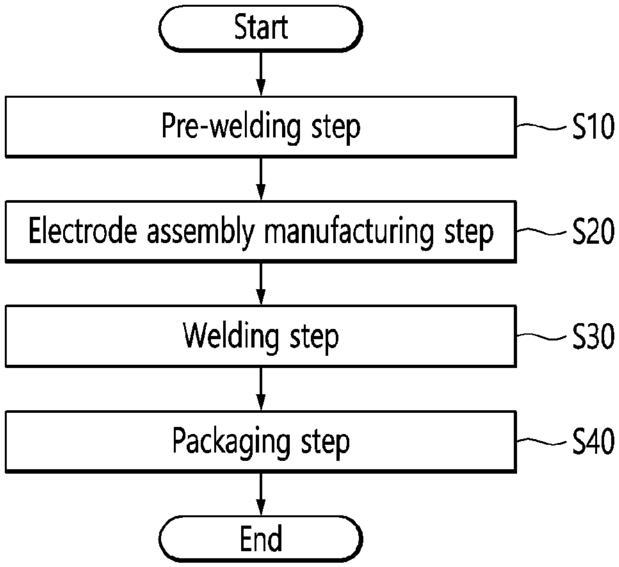

BATTERY CELL AND BATTERY MODULE INCLUDING THE SAME

CROSS-REFERENCE TO RELATED APPLICATIONS

The present application is a national phase entry under 35 U.S.C. § 371 of the International Application No. PCT/KR2021/015243 filed on Oct. 27, 2021, which claims priority from Korean Patent Application No. 10-2020-0157743 filed on Nov. 23, 2020, and Korean Patent Application No. 10-2021-0143813 filed on Oct. 26, 2021, all of which are incorporated herein by reference in their entireties.

The present disclosure relates to a battery cell and a battery module including the same, and more particularly, to a battery cell having improved safety and a battery module including the same.

BACKGROUND OF THE INVENTION

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of a battery case, a secondary battery is classified into a cylindrical battery where an electrode assembly is mounted in a cylindrical metal can, a prismatic battery where an electrode assembly is mounted in a prismatic metal can, and a pouch-type battery where an electrode assembly is mounted into a pouch type case formed of an aluminum laminate sheet. Here, the electrode assembly mounted in the battery case is an electricity-generating device enabling charge and discharge that has a structure of a cathode, an anode, and a separator interposed between the cathode and the anode, and is divided into a jelly-roll type in which an electrode assembly including a separator interposed between the cathode and the anode, each made of an active material-coated long sheet, is rolled, and a stack-type in which a plurality of cathodes and a plurality of anodes are stacked in this order such that a separator is interposed between the cathode and the anode.

Among them, in particular, a pouch-type battery having a structure in which a stack-type or stack/folding-type electrode assembly is mounted in a pouch-type battery case of an aluminum laminate sheet is gradually increasing in its usage amount due to low manufacturing cost, small weight, easy deformation, and the like.

FIG. 1 is an exploded perspective view of a conventional battery cell. FIG. 2 is an enlarged perspective view of an end of an electrode assembly included in the battery cell of FIG. 1.

Referring to FIGS. 1 and 2, the conventional battery cell 10 includes an electrode assembly 30 including a cathode 33, an anode 34, and a separator 35 interposed therebetween, and an electrolyte solution in the battery case 20. Here, the secondary battery 10 has a structure in which the two electrode leads 40 and 41 electrically connected to the cathode tabs 31 and the anode tabs 32 of the electrode assembly 30 are sealed so as to be exposed to the outside.

Here, in order to test the safety on the occasion of ignition, explosion, etc. during use, the conventional battery cells 10 collide by applying an external force to the battery in a fully charged state or penetrate sharp metal foreign objects to check if a short-circuit phenomenon occurs and if there is a fire.

At this time, when a short-circuit phenomenon occurs in a part of the electrodes in the battery cell 10, in the electrode where the short-circuit phenomenon does not occur, an overcurrent phenomenon occurs in which current moves to the electrode where the short-circuit phenomenon occurs through the welded surface of the electrode tab 31, 32. Thereby, there is a problem that the electrode in which short-circuit phenomenon occurred generates heat due to an overcurrent phenomenon, and then reaches a thermal runaway state to cause ignition. That is, even if a short circuit occurs in some electrodes within the battery cells, there is a need to develop a battery cell that can suppress overcurrent caused by other electrodes and thus ensure safety.

BRIEF SUMMARY OF THE INVENTION

It is an object of the present disclosure to provide a battery cell that is improved in safety by suppressing overcurrent that may occur between a plurality of electrode plates in the battery cell, and a battery module including the same.

The objects of the present disclosure are not limited to the aforementioned objects, and other objects which are not described herein should be clearly understood by those skilled in the art from the following detailed description and the accompanying drawings.

According to one aspect of the present disclosure, there is provided a battery cell comprising: an electrode assembly containing a plurality of electrode plates stacked with a separator interposed therebetween; and a battery case in which the electrode assembly is mounted onto a receiving part, wherein the electrode assembly comprises a plurality of electrode tabs that are respectively formed to extend from the plurality of electrode plates, wherein the plurality of electrode tabs are mutually arranged on the same line with the same polarity to form an electrode tab arrangement body, and wherein one or more protection members are joined to the ends of the plurality of electrode tabs.

A protection member of the one or more protection members are joined to a part of the ends of the plurality of electrode tabs, and another protection member of the one or more protection members may be joined to the rest of the ends of the plurality of electrode tabs.

The protection member is joined to each of the ends of the plurality of electrode tabs.

The protection member may be broken when heat of a first temperature or more is applied.

The first temperature may be a temperature of the resistance heat generated when a current equal to or greater than a first current flows through the electrode plate.

The first current may be a current of 10 C or more.

The protection member may include a Pb—Sn (lead-tin) alloy.

The protection member may be composed of an alloy containing 30 wt % to 45 wt % of lead (Pb) and 55 wt % to 70 wt % of tin (Sn).

The battery may further include an electrode lead that is electrically connected to the electrode tab assembly and protrudes outward of the battery case.

The end of the electrode tab arrangement body may be in contact with the electrode lead.

The end of the protection member may be in contact with the electrode lead.

The battery case may include a sealing part having a structure in which the outer periphery is sealed by heat-sealing, and at least one of the upper and lower parts of the electrode lead may include a lead film located at a portion corresponding to the sealing part.

The electrode lead includes a first electrode lead part and a second electrode lead part, the first electrode lead part extends along an end of the electrode tab arrangement body, and the second electrode lead part may protrude from the first electrode lead part in an outer direction of the battery case.

The lead film may be located on the second electrode lead part.

According to another aspect of the present disclosure, there is provided a method of manufacturing a battery cell, the method comprising the steps of: a pre-welding step in which a protection member is joined to an electrode tab formed by extending from the electrode plate; an electrode assembly manufacturing step in which an electrode assembly is manufactured by interposing a separator between the plurality of electrode plates to which the protection member is joined; and a welding step in which the plurality of electrode tabs included in the electrode assembly are mutually stacked with the same polarity to form an electrode tab arrangement body, and an end of the electrode tab stack and an electrode lead are in contact with each other.

The method of manufacturing a battery cell may further include a packaging step of mounting the electrode assembly electrically connected to the electrode lead onto a receiving part of a battery case.

According to yet another aspect of the present disclosure, there is provided a battery module comprising the above-mentioned battery cell.

According to embodiments, the present disclosure can provide a battery cell including a plurality of electrode plates having a protection member that is joined to an end of an electrode tab, and a battery module including the same, thereby suppressing an overcurrent that may be generated between a plurality of electrode plates in the battery cell, and improving the safety.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view of a conventional battery cell;

FIG. 2 is an enlarged perspective view of an end of an electrode assembly included in the battery cell of FIG. 1;

FIG. 3 is an exploded perspective view of a battery cell according to the present embodiment;

FIG. 4 is an enlarged perspective view of an end of an electrode assembly included in the battery cell of FIG. 2;

FIG. 6 is an enlarged perspective view of an end of the electrode assembly when short-circuit phenomenon occurs in a part of the electrode assemblies of the battery cell of FIG. 2; and FIG. 7 is a flowchart showing a method of manufacturing a battery cell according to the present embodiment.

DETAILED DESCRIPTION OF THE EMBODIMENTS

Figure 5:
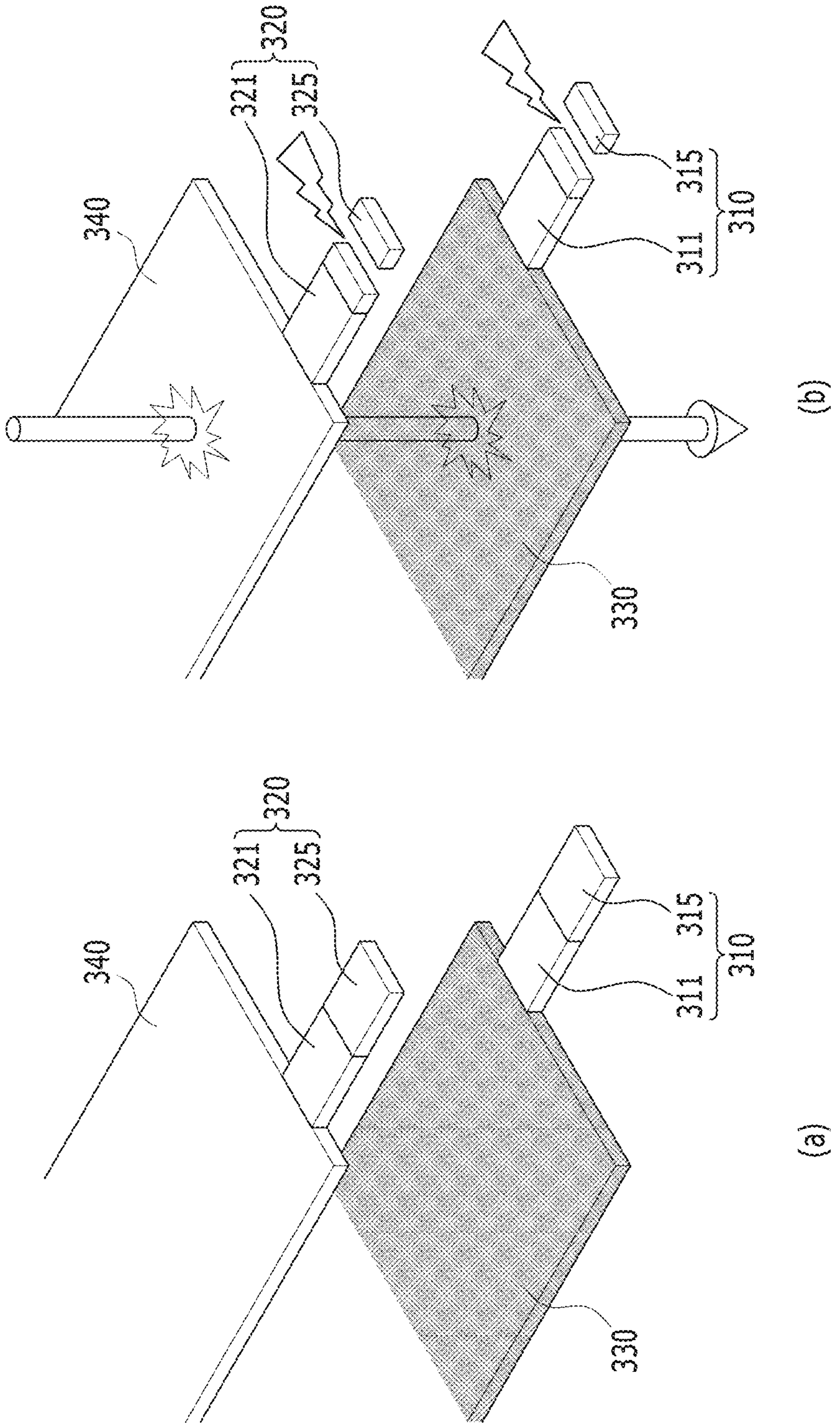
FIG. 5 is an enlarged perspective view of an end of an electrode plate included in the electrode assembly of FIG. 3.

Hereinafter, various embodiments of the present disclosure will be described in detail with reference to the accompanying drawings so that those skilled in the art can easily carry out them. The present disclosure can be modified in various different ways, and is not limited to the embodiments set forth herein.

A description of parts not related to the description will be omitted herein for clarity, and same or like reference numerals designate same or like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 3 is an exploded perspective view of a battery cell according to the present embodiment. FIG. 4 is an enlarged perspective view of an end of an electrode assembly included in the battery cell of FIG. 2.

Referring to FIGS. 3 and 4, the battery cell 100 according to the present embodiment includes an electrode assembly 300 containing a plurality of electrode plates 330 and 340 stacked with a separator (not shown) interposed therebetween, and a battery case 200 in which the electrode assembly 300 is mounted onto a receiving part 230. Here, the battery cell may have a structure in which the two electrode leads 400 and 410 are sealed so as to be exposed to the outside, in which the two electrode leads 400 and 410 are electrically connected to the plurality of electrode tabs 310 and 320 extending from the plurality of electrode plates 330 and 340 of the electrode assembly 300.

As one example, the battery case 200 is a pouch-type battery case, and may be composed of a case body 210 including the recessed receiving part 230 on which the electrode assembly 300 is seated and which can contain an electrolyte solution, and a cover 220 integrally connected to a case body 210. Further, in the battery case 200, the outer peripheral parts of the case body 210 and the cover 220 is sealed to form a sealing part, so that the inner space can be sealed. However, the embodiment of the present disclosure is not limited to the above-mentioned structure, and can be replaced with a battery case of a secondary battery having a general structure.

As one example, the electrolyte solution means a liquid electrolyte, which can move ions between the cathode and the anode, and the secondary battery can be charged and discharged through ion exchange between the cathode and the anode. The electrolyte solution used herein may include an organic liquid electrolyte, an inorganic liquid electrolyte, a solid polymer electrolyte, a gel type polymer electrolyte, a solid inorganic electrolyte, a molten inorganic electrolyte or the like which can be used in the production of a lithium secondary battery, but is not limited thereto.

Next, the remaining components excluding the battery case 200 from the battery cell 100 will be mainly described.

Referring to FIGS. 3 and 4, in the battery cell 100 according to the present embodiment, the electrode assembly 300 may be a stack-type electrode assembly or a stack/folding-type electrode assembly. However, the expression of the separator (not shown) included in the electrode assembly 300 in FIG. 4 is omitted, and in the battery cell 100 according to the present embodiment, a separator (not shown) may be interposed between the cathode plate 330 and the anode plate 340 in the electrode assembly 300 depending on the shape of the electrode assembly 300.

Further, the electrode assembly 300 includes a plurality of electrode tabs 310 and 320 extending from the plurality of electrode plates 330 and 340, respectively, and the plurality of electrode tabs 310 and 320 may be mutually arranged on the same line with the same polarity to form an electrode tab arrangement body.

As one example, the electrode assembly 300 has a structure in which a plurality of cathode tabs 310 formed to extend from the plurality of cathode plates 330 can be mutually arranged to form a cathode tab arrangement body, and a plurality of anode tabs 320 formed to extend from the plurality of anode plates 340 can be mutually arranged to form an anode tab arrangement body.

FIG. 5 is an enlarged perspective view of an end of an electrode plate included in the electrode assembly of FIG. 3. FIG. 5(*a*) is an enlarged perspective view of the end of the electrode plate in which a short-circuit phenomenon does not occur, and FIG. 5(*b*) is an enlarged perspective view of an end of an electrode plate in which a short-circuit phenomenon occurs.

Referring to FIGS. 3 to 5(*a*), in the electrode assembly 300, the electrode plates 330, 340 may be formed by extending the electrode tabs 310, 320, and one or more protection members 315, 325 may be joined to the ends of the electrode tabs 310, 320.

More specifically, in the electrode assembly 300, a protection member 315 or 325 of the one or more protection members 315 and 325 is joined to a part of the ends of the plurality of electrode tabs 310 and 320, and another protection member 315 or 325 of the one or more protection members 315 and 325 may be joined to the rest of the ends of the plurality of electrode tabs 310 and 320.

As on example, the electrode assembly 300 includes two protection members 315 and 325, and one of the two protection members 315 and 325 is joined to a part of the ends of the plurality of electrode tabs 310 and 320, and the other one of the two protection members 315 and 325 may be joined to the rest of the ends of the plurality of electrode tabs 310 and 320. However, the present disclosure is not limited thereto, and this is a case in which two or more protection members 315 and 325 are included, and a case in which a part of the ends of the plurality of electrode tabs 310 and 320 are joined to each of the protection members 315 and 325 may also be included in the present embodiment.

Further, in the electrode assembly 300, the protection members 315 and 325 may be joined to each of the ends of the plurality of electrode tabs 310 and 320.

As one example, the electrode assembly 300 includes a plurality of protection members 315 and 325 as shown in FIG. 4, and the protection members 315 and 325 are respectively joined to the ends of the plurality of electrode tabs 310 and 320. More specifically, in the electrode assembly 300, the electrode tabs 310 and 320 include electrode tab parts 311 and 321 and protection members 315 and 325, and the ends of the electrode tab parts 311 and 321 and the protection members 315 and 325 may be joined to each other. More specifically, the first protection member 315 may be joined to each end of the cathode tab part 311, and a second protection member 325 may be joined to each end of the anode tab part 321.

Referring to FIG. 5(*b*), the protection members 315 and 325 may be made of a material that is broken when heat of a first temperature or more is applied. Here, the first temperature may be a temperature at which an abnormal phenomenon such as an overcurrent flowing due to a short-circuit phenomenon occurring in the electrode plates 330 and 340 occur. More specifically, it may be the temperature of resistance heat generated when a current equal to or greater than the first current flows through the electrode plates 330 and 340. Here, the first current may be 10 C (C-rate). That is, the protection members 315 and 325 may be broken as a current of 10 C or more flows. Further, the first temperature may be a temperature of 100 degrees Celsius or more. That is, the protection members 315 and 325 may be broken as heat of a temperature of 100 degrees Celsius or more is transferred.

Thereby, when a current of 10 C (C-rate) or more flows in a part of the plurality of electrode plates 330 and 340 and/or when heat of a temperature of 100 degrees Celsius or more is transferred, the protection members 315 and 325 may be broken. That is, even if a short-circuit phenomenon occurs in a part of the plurality of electrode plates 330 and 340, the protection members 315 and 325 of the electrode plates 330 and 340 in which the short-circuit phenomenon occurred are broken, which can limit the movement of electrons between the electrode plates 330 and 340 in which the short-circuit phenomenon occurred and the electrode plates 330 and 340 in which the short-circuit phenomenon did not occur. That is, it is possible to prevent an overcurrent phenomenon of the electrode plates 330 and 340 in which the short-circuit phenomenon occurs, and thus improve the stability.

Here, when a current of less than 10 C (C-rate) flows in a part of the plurality of electrode plates 330 and 340 and/or when heat of a temperature of less than 100 degrees Celsius is transferred, the protection members 315 and 325 may not be broken. This is because a part of the plurality of electrode plates 330 and 340 are simply heated, and the amount of heat does not exceed the amount of heat emitted, and thus does not reach the ignition mode of the battery cell 100.

Unlike the same, if a current of less than 10 C (C-rate) flows and/or if heat of a temperature of less than 100 degrees Celsius is transferred, there is a problem that when the protection members 315 and 325 are broken, the current may be interrupted even though the electrode plates 330 and 340 are simply heat-generating electrode plates in which an abnormal phenomenon does not occur.

The protection members 315 and 325 may be formed of zinc, tin, and lead as a main component, or may be an alloy containing these as main components. As one example, the protection members 315 and 325 may include a Pb—Sn (lead-tin) alloy. However, the protection members 315 and 325 are not limited to the above-mentioned materials, and may include a constituent material contained in a typical fuse.

When the protection members 315 and 325 include a Pb—Sn (lead-tin) alloy, the protection members 315 and 325 may be composed of an alloy containing 30 wt % to 45 wt % of lead (Pb) and 55 wt % to 70 wt % of tin (Sn). More specifically, the protection members 315 and 325 may be composed of an alloy containing 33 wt % to 43 wt % of lead (Pb) and 57 wt % to 67 wt % of tin (Sn). As one example, the protection members 315 and 325 may be composed of an alloy containing 35 wt % to 40 wt % lead (Pb) and 60 wt % to 65 wt % tin (Sn).

Thereby, the protection members 315 and 325 include a Pb—Sn (lead-tin) alloy in a ratio within the above range, a phase change may proceed from a solid to a liquid depending on the heat generation temperature generated in the electrode plates 330 and 340 in which the short-circuit phenomenon occurs. That is, due to the phase change of the protection members 315 and 325, the protection members 315 and 325 of the electrode plates 330 and 340 in which the short-circuit phenomenon occurred may be broken, and can limit the movement of electrons flowing to the electrode plates 330 and 340 in which the short-circuit phenomenon occurs. That is, it is possible to prevent an overcurrent phenomenon of the electrode plates 330 and 340 in which the short-circuit phenomenon occurs, and thus improve the stability.

Referring to FIGS. 3 and 4, the battery cell 100 according to the present embodiment is electrically connected to the electrode tab arrangement body, and includes electrode leads 400 and 410 protruding outward of the battery case 200. Further, the battery case 200 includes a sealing part 240 having a structure in which the outer peripheral part is sealed by heat-sealing, and at least one of the upper and lower parts of the electrode leads 400 and 410 may include a lead film 500 located at a portion corresponding to the sealing part 240.

More specifically, the cathode tab arrangement body formed by arranging a plurality of cathode tabs 310 may be electrically connected to the cathode lead 400, and the anode tab arrangement body formed by arranging a plurality of anode tabs 320 may be electrically connected to the anode lead 410.

Here, electrode leads 400 and 410 may be mutually joined at an end of the electrode tab arrangement body. More specifically, the cathode tab arrangement body formed by mutually arranging a plurality of cathode tabs 310 may be mutually joined to the cathode lead 400, and the anode tab arrangement body formed by mutually arranging a plurality of anode tabs 320 may be mutually joined to the anode lead 410. As one example, the ends of the electrode tab arrangement body and the electrode leads 400 and 410 may be mutually joined by welding or heat-sealing.

Further, at the end of the electrode tab arrangement body, the ends of the protection members 315 and 325 joined to the plurality of electrode tabs 310 and 320 may be mutually joined to the electrode leads 400 and 410. More specifically, an end of the first protection member 315 joined to each end of the plurality of cathode tabs 310 may be mutually joined to the cathode lead 400, and the ends of the second protection member 325 joined to each end of the plurality of anode tabs 320 may be joined to the anode lead 410. As one example, the ends of the protection members 315 and 325 and the electrode leads 400 and 410 may be mutually joined by welding or heat-sealing.

Further, referring to FIGS. 3 and 4, in the battery cell 100 according to the present embodiment, the electrode leads 400 and 410 may include a first electrode lead part and a second electrode lead part. Here, the first electrode lead part extends along an end of the electrode tab arrangement body in which a plurality of electrode tabs 310 and 320 are arranged with each other, and the second electrode lead part may protrude outward of the battery case 200 from the first electrode lead part.

Here, an end of the electrode tab arrangement body may be mutually joined to the first electrode lead part of the electrode leads 400 and 410. More specifically, the cathode tab arrangement body formed by mutually arranging a plurality of cathode tabs 310 may be joined to the first electrode lead part of the cathode lead 400, and the anode tab arrangement body formed by mutually arranging a plurality of anode tabs 320 may be mutually joined to the first electrode lead part of the anode lead 410. As one example, an end of the electrode tab assembly and the first electrode lead part of the electrode leads 400 and 410 may be mutually joined by welding or heat-sealing.

Further, at the end of the electrode tab arrangement body, the ends of the protection members 315 and 325 joined to the plurality of electrode tabs 310 and 320 may be mutually joined to the electrode leads 400 and 410. More specifically, an end of the first protection member 315 joined to each end of the plurality of cathode tabs 310 may be mutually joined to the first electrode lead part of the cathode lead 400, and an end of the second protection member 325 joined to each end of the plurality of anode tabs 320 may be mutually joined to the first electrode lead portion of the anode lead 410. As one example, the ends of the protection members 315 and 325 and the first electrode lead ports of the electrode leads 400 and 410 may be mutually joined by welding or heat-sealing.

Here, the lead film 500 may be located on the second electrode lead part. More specifically, the lead film 500 may be located at a portion corresponding to the sealing part 240 in the second electrode lead part.

FIG. 6 is an enlarged perspective view of an end of the electrode assembly when short-circuit phenomenon occurs in a part of the electrode assemblies of the battery cell of FIG. 2.

Referring to FIGS. 3 to 6, in the battery cell 100 according to the present embodiment, when a short-circuit phenomenon occurs in a part of the plurality of electrode plates 330 and 340, the protection members 315 and 325 connected to the electrode tabs 310 and 320 of the corresponding electrode plates 330 and 340 may be broken. Here, in the case of an electrode plate in which a short-circuit phenomenon does not occur among a part of the plurality of electrode plates 330 and 340, the protection members 315 and 325 can be maintained without being broken.

Thereby, as the protection members 315 and 325 are broken in the electrode plates 330 and 340 in which the short-circuit phenomenon occurred, the movement of electrons from the electrode plates 330 and 340 in which the short-circuit phenomenon does not occur may be limited, so that an overcurrent phenomenon and a thermal runaway phenomenon can be prevented. In addition, the electrode plates 330 and 340 in which the short-circuit phenomenon does not occur can normally perform the battery function unlike the electrode plates 330 and 340 in which the short circuit phenomenon occurred, so that a sudden shutdown of the device including the battery cell 100 can be prevented.

FIG. 7 is a flowchart showing a method of manufacturing a battery cell according to the present embodiment.

Referring to FIG. 7, the method for manufacturing a battery cell according to an embodiment of the present disclosure includes a pre-welding step S10; an electrode assembly manufacturing step S20; and a welding step S30.

Referring to FIGS. 5 and 7, the pre-welding step S10 may be a step of joining the protection members 315 and 325 to the ends of the electrode tabs 311 and 321 that are formed to extend from the electrode plates 330 and 340, respectively. As one example, the ends of the electrode tab parts 311 and 321 and the protection members 315 and 325 may be mutually joined by welding or heat-sealing.

Referring to FIGS. 3, 4 and 7, the electrode assembly manufacturing step S230 can manufacture the electrode assembly 300 by interposing a separator (not shown) between the plurality of electrode plates 330 and 340 to which the protection members 315 and 325 are joined. At this time, the electrode assembly 300 can be manufactured by a stack-type or stack/folding type assembly method.

Referring to FIGS. 3, 4 and 7, the welding step S30 may be a step of forming an electrode tab arrangement body in which a plurality of electrode tabs 310 and 320 included in the electrode assembly 300 are mutually stacked with the same polarity, and mutually joining the end of the electrode tab stack and the electrode leads 400 and 410. As one example, the end of the electrode tab stack and the electrode leads 400 and 410 may be mutually joined by welding or heat-sealing. At this time, an end of the electrode tab stack, which is joined to the electrode leads 400 and 410, may be an end of the protection members 315 and 325.

Further, the method of manufacturing the battery cell according to the present embodiment may further include a packaging step S40 of mounting the electrode assembly electrically connected to the electrode lead onto the receiving part of the battery case.

Thereby, the method of manufacturing the battery cell according to the present embodiment manufactures the battery cell 100 including the plurality of electrode plates 330 and 340 including the protection members 315 and 325, whereby the movement of electrons can be individually limited for an electrode plate in which a short-circuit phenomenon occurred among the electrode plates 330 and 340. That is, it is possible to prevent an overcurrent phenomenon and a thermal runaway phenomenon with respect to the electrode plate in which the short-circuit phenomenon occurred, thereby improving the stability. In addition, the electrode plates 330 and 340 in which the short-circuit phenomenon does not occur can normally perform a battery function, so that a sudden shutdown of a device including the battery cell 100 can be prevented.

A battery module according to another embodiment of the present disclosure includes the battery cells described above. Meanwhile, one or more battery modules according to the present embodiment can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous changes and modifications can be devised by those skilled in the art using the principles of the invention defined in the appended claims, which also falls within the spirit and scope of the present disclosure.

DESCRIPTION OF REFERENCE NUMERALS

100: battery cell
200: battery case
300: electrode assembly
311, 315: protection member
400, 410: electrode leads
500: lead film

The invention claimed is:

1. A battery cell comprising:

an electrode assembly containing a plurality of electrode plates stacked with a separator interposed therebetween;

a battery case in which the electrode assembly is mounted onto a receiving part; and an electrode lead electrically connected to the electrode tab arrangement body and protruding outward of the battery case, wherein the electrode assembly comprises a plurality of electrode tabs respectively formed to extend from the plurality of electrode plates, wherein the plurality of electrode tabs are mutually arranged on a same line with a same polarity to form an electrode tab arrangement body, wherein one or more protection members are joined to ends of the plurality of electrode tabs, wherein the one or more protection members are configured to be broken when heat of a first temperature or more is applied; and an end of the electrode tab arrangement body is in contact with the electrode lead.

2. The battery cell of claim 1, wherein:

a protection member of the one or more protection members is joined to a part of the ends of the plurality of electrode tabs, and another protection member of the one or more protection members is joined to rest of the ends of the plurality of electrode tabs.

3. The battery cell of claim 1, wherein:

the one or more protection members are joined to each of the ends of the plurality of electrode tabs.

4. The battery cell of claim 1, wherein:

the first temperature is a temperature of the resistance heat generated when a current equal to or greater than a first current flows through the electrode plate.

5. The battery cell of claim 1, wherein:

the first current is a current of 10C or more.

6. The battery cell of claim 1, wherein:

the one or more protection members comprise a Pb—Sn (lead-tin) alloy.

7. The battery cell of claim 6, wherein:

the one or more protection members comprise an alloy containing 30 wt % to 45 wt % of lead (Pb) and 55 wt % to 70 wt % of tin (Sn).

8. The battery cell of claim 1, wherein:

ends of the one or more protection members are in contact with the electrode lead.

9. The battery cell of claim 1, wherein:

the battery case comprises a sealing part having a structure in which the outer periphery is sealed by heat-sealing, and at least one of upper and lower parts of the electrode lead comprises a lead film located at a portion corresponding to the sealing part.

10. The battery cell of claim 9, wherein:

the electrode lead comprises a first electrode lead part and a second electrode lead part, the first electrode lead part extends along an end of the electrode tab arrangement body, and the second electrode lead part protrudes from the first electrode lead part in an outer direction of the battery case.

11. The battery cell of claim 10, wherein:

the lead film is located on the second electrode lead part.

12. The battery cell of claim 1, wherein the one or more protection members are directly joined to the ends of the plurality of electrode tabs.

13. A battery module comprising the battery cell of claim 1.

* * * * *